United States Patent Office 3,470,170
Patented Sept. 30, 1969

3,470,170
DIFLUORAMINATED UREA DERIVATIVES
Andrew Harper Dinwoodie, Dalry, and Godfrey Fort, Ardrossan, Scotland, assignors, by mesne assignments, to the United States of America as represented by the Secretary of the Navy
No Drawing. Filed Mar. 10, 1967, Ser. No. 622,092
Claims priority, application Great Britain, Apr. 13, 1966, 16,275/66
Int. Cl. C07d 87/00; C07c 127/00, 127/16
U.S. Cl. 260—244          6 Claims

ABSTRACT OF THE DISCLOSURE

New organic nitrogen compounds which are N-difluoraminomethyl-N'-(2,2,2 - trinitroethyl)urea and -uron and tris(difluoraminomethyl) - (2,2,2 - trinitroethyl)urea. The new compounds are useful energetic constituents of high energy propellent compositions.

The mono(difluoraminomethyl) substituted urea and uron are prepared by refluxing difluoramine with, respectively, N - methylol-N' - (2,2,2 - trinitroethyl)urea and N - methoxymethyl - N' - (2,2,2 - trinitroethyl)uron in an inert atmosphere and in the presence of concentrated sulphuric acid.

The tris(difluoraminomethyl) substituted urea is prepared by reacting difluoramine with N - methoxymethyl-N'-(2,2,2-trinitroethyl)uron at 20° C. in an inert atmosphere and in the presence of concentrated sulphuric acid.

---

This invention relates to new urea derivatives containing difluoraminomethyl and trinitroethyl groups generally classified as N-difluoraminomethyl - N' - (2,2,2-trinitroethyl)urea derivatives. The invention also relates to the method of preparation of these compounds.

The compounds may be represented by the general formula $$\begin{array}{c} F_2NCH_2 \diagdown \quad \diagup CH_2C(NO_2)_3 \\ N.CO.N \\ \diagup \qquad \diagdown \\ R^1 \qquad R^2 \end{array}$$
I wherein $R^1$ and $R^2$, which may be the same or different, each represents hydrogen or monovalent organic groups such as, for example, alkyl, substituted alkyl, hydroxymethyl, alkoxymethyl or difluoraminomethyl. The compounds of Formula I may also be uron derivatives wherein $R^1$ and $R^2$ together form a dimethylene ether bridge.

In accordance with this invention a urea derivative of Formula I is prepared by reacting difluoramine with N-substituted-(2,2,2-trinitroethyl) derivatives of urea having the formula $$R^3OCH_2NCONCH_2C(NO_2)_3$$
$$\quad\; |\qquad\quad |$$
$$\quad R^1 \qquad R^2$$
II wherein $R^1$ and $R^2$ have the meanings given above and $R^3$ represents hydrogen or a monovalent organic group such as, for example, alkyl, aryl or acyl, in an inert atmosphere in the presence of an acidic condensing agent. The term "inert atmosphere" is used herein to denote an atmosphere substantially free from any constituent, such as oxygen, which reacts with difluoramine. This atmosphere is readily established by initially flushing the reaction apparatus with nitrogen and maintaining a steady flow of nitrogen throughout the reaction period.

The reaction may be represented as $$\begin{array}{c} R^3OCH_2 \diagdown \quad \diagup CH_2C(NO_2)_3 \\ N.CO.N \\ \diagup \qquad \diagdown \\ R^1 \qquad R^2 \end{array} \xrightarrow{HNF_2} \begin{array}{c} F_2NCH_2 \diagdown \quad \diagup CH_2C(NO_2)_3 \\ N.CO.N \\ \diagup \qquad \diagdown \\ R^1 \qquad R^2 \end{array}$$
II                                                    I When either $R^1$ or $R^2$ or both is of the form $-CH_2OR^3$, it may also react with difluoramine to form a $-CH_2NF_2$ group. When the starting material of Formula II is a uron derivative, the uron ring may be hydrolysed either during the initial reaction or by subsequent acid hydrolysis of the reaction product. The hydrolysed product readily reacts with difluoramine to form tris((difluoraminomethyl) - 2,2,2-trinitroethyl) urea.

The 2,2,2-trinitroethyl derivatives of urea of Formula II used as starting material in the reaction may be readily prepared according to several published methods. For example, N-methylol - N' - (2,2,2 - trinitroethyl)urea is prepared as described in U.S. patent specification No. 3,097,239. The 2,2,2-trinitroethyl derivatives of uron are prepared according to our co-pending application Ser. No. 622,030, filed Mar. 10, 1967, by the action of nitroform on N,N'-bis(hydroxymethyl)uron or its ether derivatives.

The preferred acidic condensing agent is concentrated sulphuric acid of 80–100% strength by weight, but oleum of up to 65% strength by weight may also be conveniently used. Other suitable condensing agents include halogenosulphonic acid, for example, fluorosulphonic acid or chlorosulphonic acid.

The reaction may coveniently be carried out either under autogenous pressure at room temperature, or under atmospheric pressure at a lower temperature. A convenient procedure is to use excess difluoramine and to carry out the reaction under conditions of difluoramine reflux at atmospheric pressure, the reflux temperature being about $-23°$ C.

The compounds of the invention are crystalline solids which burn rapidly on ignition and explode on percussion. They are useful energetic constituents of high-energy propellent compositions.

The invention is further illustrated by the following examples in which all parts and percentages are by weight.

EXAMPLE 1

Approximately 4 parts of difluoramine were refluxed in a nitrogen atmosphere from a condenser cooled by solid carbon dioxide on to 1.0 part of N-methylol-N'-(2,2,2-trinitroethyl)urea. After 4 hours, 7.4 parts of 96–98% sulphuric acid were slowly added, the mixture stirred and the reflux continued for a further 4 hours. Excess difluoramine was removed overnight in a stream of nitrogen, and the reaction mixture was then poured on to 50 parts of crushed ice.

0.5 part of crude N-difluoraminomethyl-N'-(2,2,2-trinitroethyl)urea separated as an off-white solid which was thoroughly washed with water. The product melted with decomposition at 169–170° C., and was found to contain: C, 17.7%; H, 1.6%; F, 8.5%; N, 27.2%. The theoretical analysis of N-difluoraminomethyl - N'-(2,2,2-trinitroethyl)urea requires: C, 16.7%; H, 2.1%; F, 13.2%; N, 29.2%.

The infrared spectrum of the solid showed strong absorptions at $5.9\mu$ due to $=CO$, at $6.3\mu$ due to $-NO_2$, at $11.6\mu$ and weaker absorptions at 10.85 and $11.8\mu$ due to $-NF_2$. There were also strong absorptions at 7.7, 7.8, 8.2 and $12.7\mu$, and weaker absorptions at 7.15, 7.6, 9.25, 9.9, 12.2, 12.5 and $13.95\mu$.

EXAMPLE 2

1.0 part of N-methoxymethyl-N'-(2,2,2-trinitroethyl) uron was treated with approximately 4 parts of difluoramine and 7.4 parts of 96–98% sulphuric acid in the manner described in Example 1. 0.5 part of crude N-difluoraminomethyl-N'-(2,2,2-trinitroethyl)uron separated as an off-white solid which was thoroughly washed with water and recrystallised from isopropanol to give 0.4 part of purified N-difluoraminomethyl-N'-(2,2,2-trinitroethyl)uron. The purified product melted at 83–85° C., and was found to contain: C, 22.3%; H, 2.1%; F, 9.7%; N, 24.5%. The theoretical analysis of N-difluoraminomethyl-N'-(2,2,2-trinitroethyl)uron, $C_6H_8F_2N_6O_8$, requires: C, 21.8%; H, 2.4%; F, 11.5%; N, 25.4%. The infrared spectrum of the product showed strong absorptions at $6.0\mu$ due to =CO, at $6.3\mu$ due to —$NO_2$, at 11.1 and 11.6–11.7$\mu$ due to —$NF_2$ and other strong absorptions at 6.7, 6.9, 7.7, 12.4, 12.6 and 13.4$\mu$.

EXAMPLE 3

1.0 part of N-methoxymethyl-N'-(2,2,2-trinitroethyl)uron was placed in a thick-walled glass U-tube fitted with valves on both arms and provided with a magnetically operated stirrer. The tube was cooled to —80° C. and 7.4 parts of 96% sulphuric acid were added. 4.5 parts of difluoramine were then condensed into the cooled tube by passing a stream of difluoramine in nitrogen through the tube. The valves were then closed and the temperature of the tube was allowed to rise to 20° C. and maintained thereat for 24 hours, the contents being stirred throughout.

The tube was then chilled in a cooling bath at —80° C. and the valves were opened. The temperature of the tube was allowed to rise gradually to room temperature and residual difluoramine was allowed to vent off. The residual reaction mixture was poured into water containing crushed ice. A sticky syrup separated and was isolated by extraction with ether (5×14 parts). After washing with water and dilute sodium bicarbonate solution, the ether extract was dried over anhydrous sodium sulphate and evaporated to give approximately 1.0 part of tris(difluoraminomethyl)-(2,2,2-trinitroethyl)urea as a pale yellow syrup which was found to contain: C, 16.7%; H, 2.06%; F, 24.0%; N, 26.3%. Tris(difluoraminomethyl)-(2,2,2-trinitroethyl)urea, $C_6H_8F_6N_8O_7$, requires: C, 17.2%; H, 1.93%; F, 27.3%; N, 26.8%.

The infrared spectrum of the product showed absorption bands at 5.8$\mu$ due to =CO, at 6.2–6.3$\mu$ due to —$NO_2$. There were no absorption bands in the 3$\mu$ region, indicating the absence of —NH and —OH groups.

What we claim is:
1. An organic nitrogen compound of the group consisting of N-difluoraminomethyl-N'-(2,2,2-trinitroethyl)urea, N-difluoraminomethyl-N'-(2,2,2-trinitroethyl)uron and tris(difluoraminomethyl)-(2,2,2-trinitroethyl)urea.
2. N-difluoraminomethyl-N'-(2,2,2-trinitroethyl)urea.
3. N-difluoraminomethyl-N'-(2,2,2-trinitroethyl)uron.
4. Tris(difluoraminomethyl)-(2,2,2-trinitroethyl)urea.
5. A process for the preparation of a mono(difluoraminomethyl) substituted urea and uron compound as defined in claim 1 which comprises refluxing an excess of difluoramine with a member of the group consisting of N-methylol-N'-(2,2,2-trinitroethyl)urea and N-methoxymethyl-N'-(2,2,2-trinitroethyl)uron in an inert atmosphere and in the presence of concentrated sulphuric acid.
6. A process of preparing the tris(difluoraminomethyl) substituted urea compound defined in claim 1 which comprises subjecting a mixture of N-methoxymethyl-N'-(2,2,2-trinitroethyl)uron, concentrated sulphuric acid and difluoramine in an inert atmosphere to heat at a temperature of about 20° C. for a time sufficient to form tris(difluoraminomethyl)-(2,2,2-trinitroethyl)urea.

References Cited

UNITED STATES PATENTS 3,097,239  7/1963  Tawney _____ 260—553

OTHER REFERENCES

Pankratov: Russian Chemical Reviews, vol. 32, pp. 157–62 relied on (1963).

HENRY R. JILES, Primary Examiner

NATALIE TROUSOF, Assistant Examiner

U.S. Cl. X.R.
149—92; 260—553